United States Patent
Yogo et al.

(10) Patent No.: US 6,814,394 B2
(45) Date of Patent: Nov. 9, 2004

(54) DOOR APPARATUS FOR A VEHICLE

(75) Inventors: Hiroyuki Yogo, Plymouth, MI (US); Hideharu Kato, Toyota (JP); Eiji Itami, Chiryu (JP); Tomoaki Imaizumi, Aichi-ken (JP); Tomonori Suzuki, Seto (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 0 days.

(21) Appl. No.: 10/681,275

(22) Filed: Oct. 9, 2003

(65) Prior Publication Data

US 2004/0070231 A1 Apr. 15, 2004

Related U.S. Application Data

(62) Division of application No. 10/293,548, filed on Nov. 14, 2002, now Pat. No. 6,659,539.

(30) Foreign Application Priority Data

Nov. 15, 2001 (JP) ........................................ 2001-350725

(51) Int. Cl.[7] ................................................ B60J 5/06
(52) U.S. Cl. ........................................ 296/155; 49/360
(58) Field of Search .............................. 296/155, 146.1, 296/146.8, 146.2, 201, 37.16, 56; 49/360, 352, 374, 213, 362, 498.1; 280/804, 802, 807, 808; 70/456 R; 292/201, 216, 336, DIG. 23, DIG. 46

(56) References Cited

U.S. PATENT DOCUMENTS

| | | | | |
|---|---|---|---|---|
| 4,612,729 A | | 9/1986 | Sato | |
| 5,018,303 A | * | 5/1991 | Koura et al. ................... | 49/360 |
| 5,389,920 A | * | 2/1995 | DeLand et al. ........ | 340/825.69 |
| 5,684,470 A | * | 11/1997 | DeLand et al. ........ | 340/825.69 |
| 5,746,025 A | * | 5/1998 | Shimura ...................... | 49/360 |
| 5,813,282 A | | 9/1998 | Azuma | |
| 5,836,639 A | | 11/1998 | Kleefeldt et al. | |
| 5,921,612 A | * | 7/1999 | Mizuki et al. ............... | 296/155 |
| 6,038,818 A | | 3/2000 | Haag et al. | |
| 6,081,088 A | * | 6/2000 | Ishihara et al. ................ | 49/280 |
| 6,134,837 A | * | 10/2000 | Kawanobe et al. ........... | 49/360 |
| 6,152,519 A | | 11/2000 | Blank et al. | |
| 6,183,040 B1 | | 2/2001 | Imaizumi et al. | |
| 6,198,242 B1 | | 3/2001 | Yokomori et al. | |
| 6,231,113 B1 | | 5/2001 | Armbruster et al. | |
| 6,270,149 B1 | | 8/2001 | Fukumoto et al. | |
| 6,321,488 B1 | | 11/2001 | Bigoszewski et al. | |
| 6,339,305 B1 | * | 1/2002 | Ishihara et al. ................. | 49/26 |
| 6,359,762 B1 | | 3/2002 | Yokomori | |
| 6,397,523 B1 | * | 6/2002 | Fukumoto et al. ............. | 49/360 |
| 6,430,875 B1 | * | 8/2002 | Clark et al. .................... | 49/360 |
| 6,481,783 B1 | * | 11/2002 | Rogers et al. ............... | 296/155 |
| 6,525,499 B2 | * | 2/2003 | Naganuma ..................... | 49/26 |
| 6,580,243 B2 | * | 6/2003 | Itami et al. .................... | 49/360 |
| 6,659,539 B2 | * | 12/2003 | Yogo et al. .................. | 296/155 |
| 6,662,500 B2 | * | 12/2003 | Inage ........................... | 49/116 |
| 2002/0153744 A1 | * | 10/2002 | Long et al. .................. | 296/155 |
| 2003/0025337 A1 | * | 2/2003 | Suzuki et al. ................ | 292/201 |

FOREIGN PATENT DOCUMENTS

| | | |
|---|---|---|
| EP | 0 464 720 | 1/1992 |
| JP | 2000-145283 | 5/2000 |
| JP | 2002-194948 | 7/2002 |

* cited by examiner

*Primary Examiner*—Kiran Patel
(74) *Attorney, Agent, or Firm*—Burns, Doane, Swecker & Mathis, L.L.P.

(57) ABSTRACT

A door is moved in an opening direction at a first speed until the door reaches a decelerating area. A moving speed of the door in the opening direction is decelerated from the first speed to a second speed being lower than the first speed while the door has been moved in the decelerating area. The movement of the door is stopped when the door is moved beyond the decelerating area, the door comes in contact with an obstacle, and the moving speed of the door becomes lower than a predetermined speed corresponding to an open position of the door by a predetermined threshold value.

8 Claims, 7 Drawing Sheets

DOOR APPARATUS FOR A VEHICLE

CROSS REFERENCE TO RELATED APPLICATIONS

This application is a divisional of application Ser. No. 10/293,548 filed Nov. 14, 2002 now U.S. Pat. No. 6,659,539.

This application is based on and claims priority under 35 U.S.C. § 119 with respect to a Japanese Patent Application 2001-350725, filed on Nov. 15, 2001, the entire content of which is incorporated herein by reference.

FIELD OF THE INVENTION

This invention generally relates to a door apparatus for a vehicle. More particularly, this invention pertains to a vehicle door, apparatus capable of moving a door in an opening direction by use of a moving unit assembled between a vehicle body and the door and a driving unit for detecting a moving speed of the door and for controlling the detected moving speed thereof.

BACKGROUND OF THE INVENTION

Conventionally, a vehicle body is equipped with a sensor for detecting an entirely open position of a door such as a slide door. When the slide door is opened in an opening direction for uncovering a door opening portion by use of a driving motor, a slidably moving operation of the slide door is terminated at the entirely open position based upon the detection of the sensor. That is, this type of known slide door apparatus for a vehicle includes, for example an on/off switch equipped to the vehicle body. When a pushing member equipped to the slide door operates the on/off switch, the slide door is judged to have been moved to the entirely open position. The rotational speed of the driving motor is then decelerated so as to terminate the slidably moving operation of the slide door in the opening direction.

When the slide door is slidably moved in the opening direction for uncovering the door opening portion, the moving speed of the vehicle door is first accelerated up to a predetermined speed by the driving motor. The slide door is slidably moved in the opening direction at the predetermined speed until the on/off switch is pressed. The slide door can be moved in the opening direction with a predetermined stroke along a slide rail fixed to the vehicle body. An edge portion at an opening side of the stroke is defined by a stopper which can come in contact with the slide door. The on/off switch is located at a position where the on/off switch is pressed by the slide door before the slide door is slidably moved to the edge portion at the opening side of the stroke. Therefore, the slide door can effectively come in contact with the stopper under the condition that the moving speed of the slide door in the opening direction has been already decelerated to a certain speed level.

However, according to the known vehicle slide door apparatus having the on/off switch, the slide door may come in contact with the stopper with an unexpectedly large force before the moving speed of the slide door is sufficiently decelerated at a desired position. The unexpected contact with the slide door and the stopper may occur due to an error for attaching the switch to the vehicle body, a malfunction of the switch, a displacement of the long-used switch, or some other factors. To overcome the aforementioned problem, the stopper and the position for attaching the on/off switch are required to be strengthened. Further, as far as the switch is required to be equipped for recognizing the entirely open position of the slide body, it takes some troubles with equipping the switch, Therefore, the known vehicle slide door apparatus include some points to be improved such as the operational performance, the manufacturing cost, and the like.

From another aspect, there are some types of vehicles each of which is provided with an intermediate stopper fixed to the slide door for preventing a window member assembled to the slide door from being left open when the slide door is slidably moved in the opening direction. For example, the intermediate stopper projects from the vehicle door towards the vehicle body when a window glass is opened with a predetermined opening amount. The intermediate stopper of the slide door can come in contact with a portion of the vehicle body before the slide door is slidably moved to the entirely open position. Therefore, the driver can effectively be reminded of the window being left open.

However, the intermediate stopper takes various postures relative to the slide door so that the intermediate stopper cannot be always provided with a sufficient strength. According to the known slide door apparatus, the slide door is slidaly moved in the opening direction at the predetermined speed until the slide door is slidably moved to a portion adjacent to the entirely open position. When the intermediate stopper is provided for the known slide door apparatus, the intermediate stopper may come in contact with the vehicle body with an unexpectedly large force. In this case, the intermediate stopper needs to have a sufficiently large strength to endure the unexpected contact with the vehicle body. Accordingly, it may require troubles for manufacturing the slide door apparatus with the intermediate stopper and a relatively high manufacturing cost thereof.

The present invention therefore seeks to provide an improved door apparatus for a vehicle capable of overcoming inconveniences of the known door apparatus and capable of completing the movement of the door in the opening direction without applying an impact force to the door or the vehicle body.

SUMMARY OF THE INVENTION

According to an aspect of the present invention, a door apparatus for a vehicle includes a door movable in an opening direction for uncovering an opening portion defined in a vehicle body and in a closing direction for covering the opening portion, a moving means assembled between the vehicle body and the door, a driving means for driving the door to be moved, and the driving means further detecting a moving speed of the door and controlling the detected moving speed of the door. The moving means includes a predetermined moving stroke in the opening direction and a decelerating area defined within the predetermined stroke for decelerating the moving speed of the door.

The door is moved in the opening direction at a first speed by use of the moving means and the driving means until the door reaches the decelerating area. The moving speed of the door in the opening direction is decelerated by the driving means from the first speed to a second speed being lower than the first speed while the door has been moved in the decelerating area. The movement of the door is stopped by the driving means when the door is moved beyond the decelerating area, the door comes in contact with an obstacle, and the moving speed of the door in the opening direction detected by the diving means becomes lower than a predetermined speed corresponding to an open position of the door by a predetermined threshold value.

The obstacle includes at least either an entirely opening stopper for specifying the open position of the door or an intermediate stopper for preventing a window member from being left open when the door is moved in the opening direction. The entirely opening stopper is provided for the vehicle body and comes in contact with the door when the door is positioned at an entirely open position. The entirely opening position corresponds to a position for uncovering the opening portion defined in the vehicle body. The intermediate stopper is provided for the vehicle body and takes various postures relative to the door in response to an opening amount of the window member and comes in contact with the door when the door is moved in the opening direction with the window member being left open with a predetermined opening amount. The door further comes in contact with the obstacle being entrapped between the door and the vehicle body and the movement of the door is stopped when the moving speed of the door becomes lower than the predetermined speed by the predetermined threshold value.

According to another aspect of the present invention, a movement of a door is stopped by a driving means when the door is moved beyond a decelerating area, a vehicle body comes in contact with an obstacle, and a moving speed of the door in an opening direction detected by the diving means becomes lower than a predetermined speed corresponding to an open position of the door by a predetermined threshold value.

The door is provided with at least either an entirely opening stopper or an intermediate stopper as the obstacle. The entirely opening stopper specifies the open position of the door and the intermediate stopper prevents a window member from being left open when the door is moved in the opening direction. The entirely opening stopper comes in contact with the vehicle body when the door is positioned at an entirely open position. The entirely opening position corresponds to a position for uncovering an opening portion defined in the vehicle body. The intermediate stopper takes various postures relative to the vehicle body in response to an opening amount of the window member and comes in contact with the vehicle body when the door is moved in the opening direction with the window member being left open with a predetermined opening amount.

BRIEF DESCRIPTION OF THE DRAWING FIGURES

The foregoing and additional features and characteristics of the present invention will become more apparent from the following detailed description considered with reference to the accompanying drawing figures wherein:

FIGS. 2(*a*) and 2(*b*) are explanatory views for explaining an operational performance of a driving unit provided for a center roller unit illustrated in FIG. 1;

FIG. 6(*a*) is an explanatory view for explaining a pivot-rotational operation of the intermediate stopper according to the embodiment of the present invention;

FIG. 6(*b*) is an explanatory view for explaining a state where the pivot-rotational operation of the intermediate stopper is restrained by a pivot rotation restraining member according to the embodiment of the present invention;

DETAILED DESCRIPTION OF THE INVENTION

Figure 1:
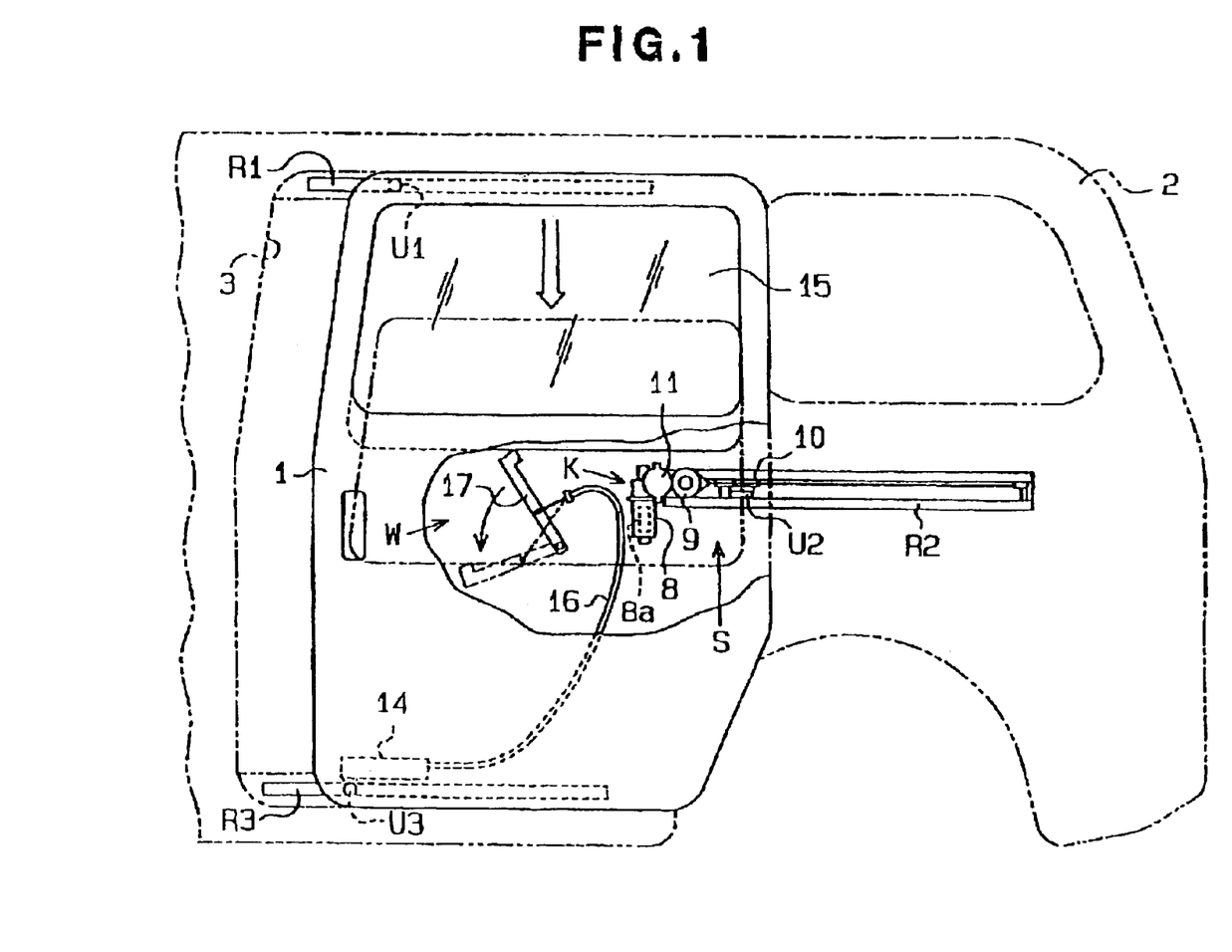
FIG. 1 is a side view illustrating a vehicle provided with a slide door apparatus according to an embodiment of the present invention.

FIG. 1 illustrates a vehicle with a vehicle slide door 1 for covering and uncovering a door opening portion 3 defined in a lateral side of a vehicle body 2. As seen specifically in FIG. 1, the slide door 1 is slidaly moved in an opening/closing direction for uncovering/covering the opening portion 3 by use of a sliding unit S (i.e. a sliding means) assembled between the vehicle body 2 and the slide door 1. Components of the sliding unit S include an upper guide rail R1, a center guide rail R2, and a lower guide rail R3, which all are secured to the vehicle body 2, and an upper roller unit U1, a center roller unit U2, and a lower roller unit U3, which all are secured to the slide door 1. The upper guide rail R1 is arranged adjacent an upper limit portion of the opening portion 3. The center guide rail R2 is arranged at an outer peripheral portion of the vehicle body 2 in a direction of a vehicle rear side from the opening portion 3 (i.e. in a direction of a right-hand side of FIG. 1). The lower guide rail R3 is arranged adjacent a lower limit portion of the opening portion 3.

The roller units U1, U2, and U3 are guided by the corresponding guide rails R1, R2, and R3. The center roller unit U2 is provided with a driving unit K (i.e. a driving means) which is described later. The lower roller unit U3 is provided with an entirely opening stopper 4 (shown in FIG. 4) for specifying an open position of the slide door 1. A slide stroke of the slide door 1 is determined by the entirely opening stopper 4. With reference to FIG. 2 through FIG. 5, each roller unit U1, U2, and U3 include plural roller members 7 assembled to a base plate 6 pivotably and movably supported by a bracket 5 fixed to the slide door 1. The plural roller members 7 are freely rotatable relative to the base plate 6.

Referring to FIG. 2 through FIG. 5, the roller members 7 for each roller unit U1, U2, and U3 are guided by each corresponding guide rail R1, R2, and R3 which is partially bent. Corresponding to the guiding of the roller members 7 by each guide rail R1, R2, and R3, the base plate 6 is pivotably rotated relative to the slide door 1 and the slide door 1 can be smoothly and slidably moved along the bent guide rails R1, R2, and R3. As specifically seen in FIGS. 2(*a*) and 2(*b*), the base plate 6 of the center roller unit U2 is pivotably rotated relative to the slide door 1 with a larger rotational amount comparing with rotational amounts of the base plates 6 of the other roller units U1 and U3. Therefore, when the slide door 1 is sildably moved in an entirely opening direction for uncovering the opening portion 3, a predetermined distance between the slide door 1 and the vehicle body 2 can be effectively attained.

<The Driving Unit K>

The driving unit K assembled to the center roller unit U2 detects a moving speed of the slide door 1 and controls the moving speed thereof. More specifically, the driving unit K is provided with a driving motor 8 assembled to the slide door 1, an output drum 9 transmitted with a rotation of the driving motor 8, and a pulley mechanism 10. The driving motor 8 is equipped with a speed reduction gear unit 11. The output drum 9 is rotatable in reciprocable directions, i.e. in forward and reverse directions.

Figure 2A:
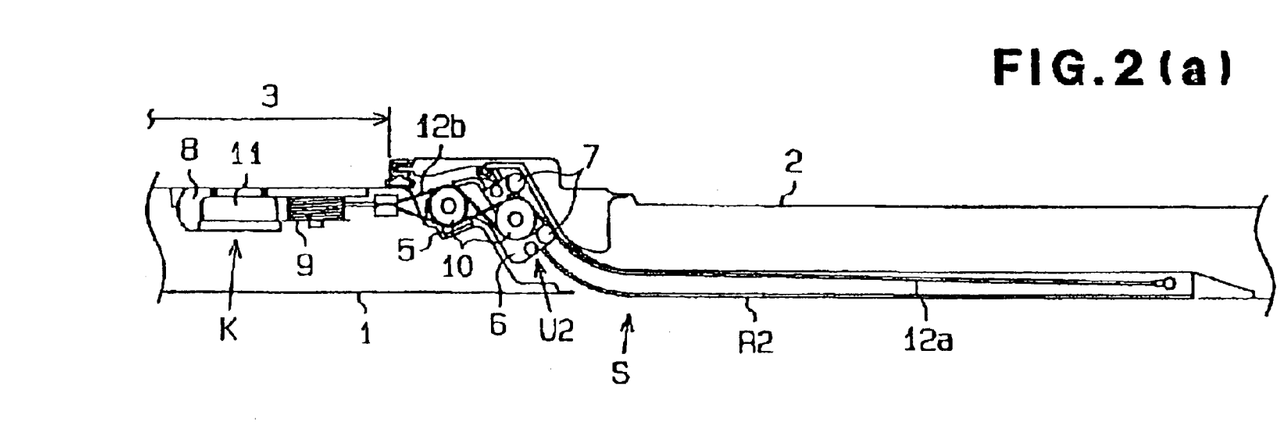
Figure 2B:
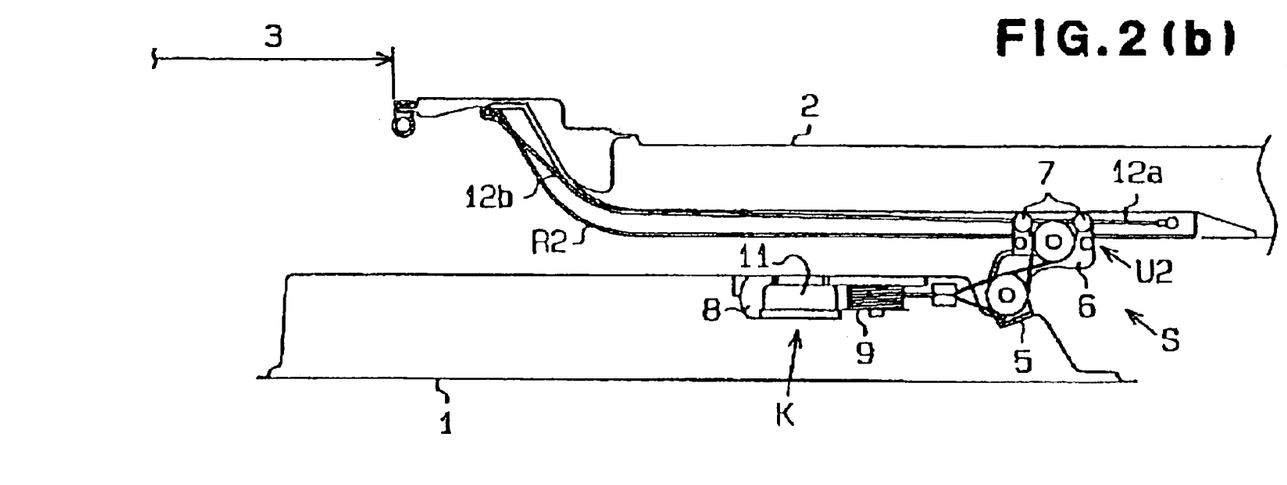
Figure 3:
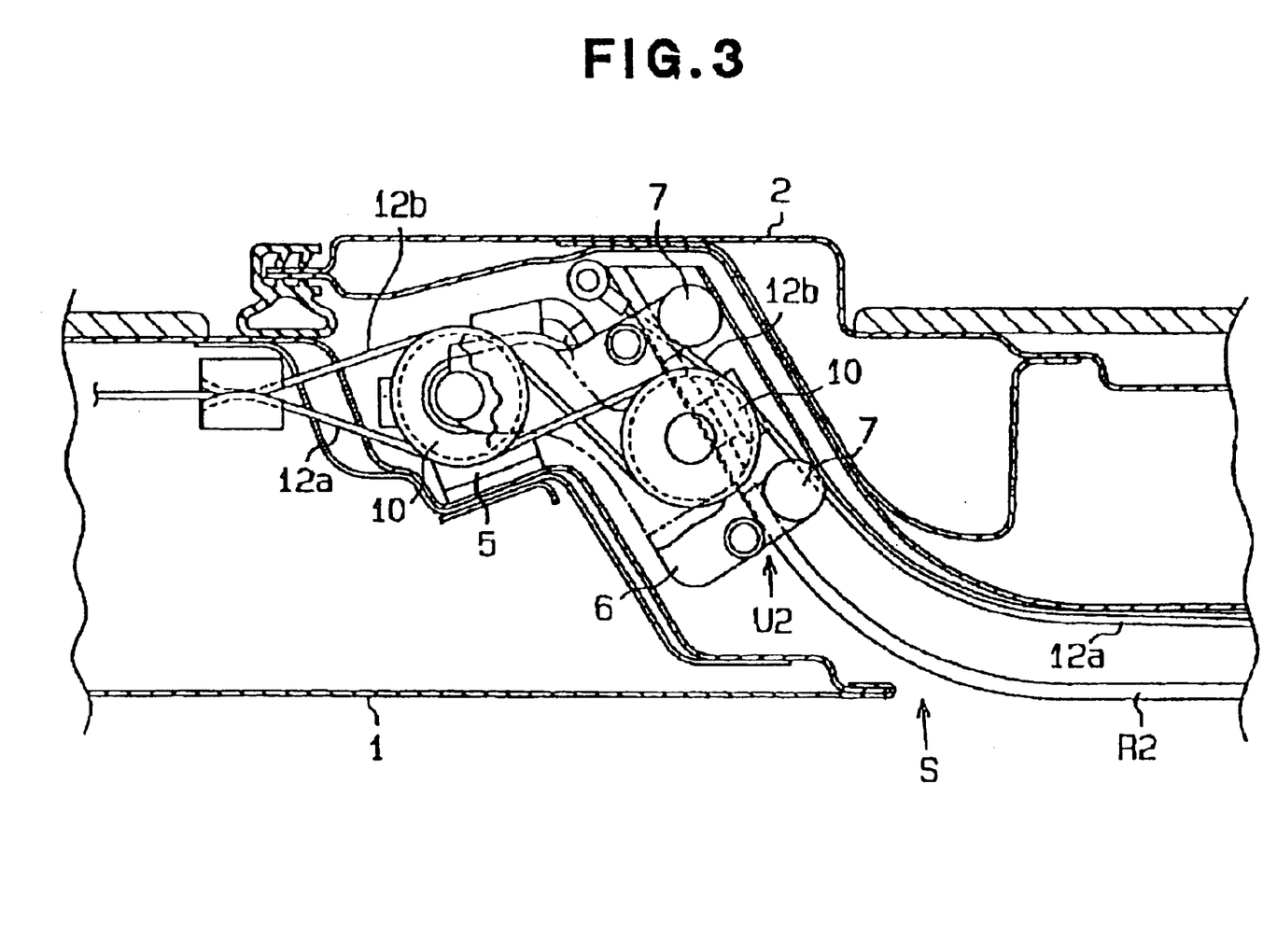
FIG. 3 is an explanatory view for explaining a pulley mechanism and details of the center roller unit illustrated in FIG. 1.

As illustrated in FIG. 2(a), a cable 12a provided for the vehicle body 2 is wound by the rotatable output drum 9 and the pulley mechanism 10. One end of the cable 12a is wound by the output drum 9. The other end of the cable 12a is secured to a rear end portion of the center guide rail R2 via the pulley mechanism 10. The vehicle body 2 is further provided with the other cable 12b of which one end is wound by the output drum 9 and other end is secured to a front end portion of the center guide rail R2. When the output drum 9 is rotated in the forward and reverse directions, the cable 12a is released from the output drum 9 and the other cable 12b is retracted by the output drum 9. Therefore, the output drum 9 is displaced relative to the vehicle body 2 and the slide door 1 can be slidably moved in the opening/closing direction for uncovering/covering the opening portion 3. Alternatively, the two cables 12a and 12b can be formed by a single cable.

The driving motor 8 is provided with a rotation detecting mechanism 8a for detecting a rotational speed of the driving motor 8, For example, the rotation detecting mechanism 8a is provided with a pulse plate (not shown) rotatable associated with the rotation of the driving motor 8 and a photo sensor (not shown) for irradiating the pulse plate. The rotational speed of the driving motor 8 can be detected based upon a cutoff interval of a light exposed to plural bore portions defined in an outer peripheral portion of the pulse plate. The total rotational number of the driving motor 8 can be obtained by integrating a cutoff frequency of the light by use of a controller (not shown). That is, a moving distance of the slide door 1 can be calculated. According to the embodiment of the present invention, the total rotational number of the driving motor 8 is reset to be zero when the slide door 1 is located at a closed position for entirely covering the opening portion 3.

The driving motor 8 is requisite for sildably moving the slide door 1 in the opening direction. According to the embodiment of the present invention, the driving motor 8 can detect the moving condition of the slide door 1 in addition to the original function as the driving means. Therefore, the slide door apparatus according to the embodiment of the present invention can surely control the slidable movement of the slide door 1 without modifying the structure of the driving unit K with a large modifying amount.

Meanwhile, there is a vehicle in which a driving motor is provided for a vehicle body. In this case, a slide door is slidably moved via a connecting wire operatively associated with the driving motor. Fluctuation of a moving speed of the slide door is transmitted to the driving motor via the connecting wire. Therefore, an error may be generated between the rotational speed of the driving motor and the actual moving speed of the slide door. Accordingly, the change of the moving speed of the slide door may not be able to be precisely detected when the slide door comes in contact with an obstacle. However, according to the embodiment of the present invention, the deceleration of the slide door 1 can be accurately detected since the driving motor 8 is assembled to the slide door 1.

Further, the cables 12a and 12b are stationary relative to the vehicle body 2. Therefore, friction between the cables 12a, 12b and the vehicle body 2 is not generated so that the wear of the cables 12a and 12b can be minimized. Therefore, the driving unit K can be space-saving and be provided with a sufficient durability.

<The Entirely Opening Stopper>

Figure 4:
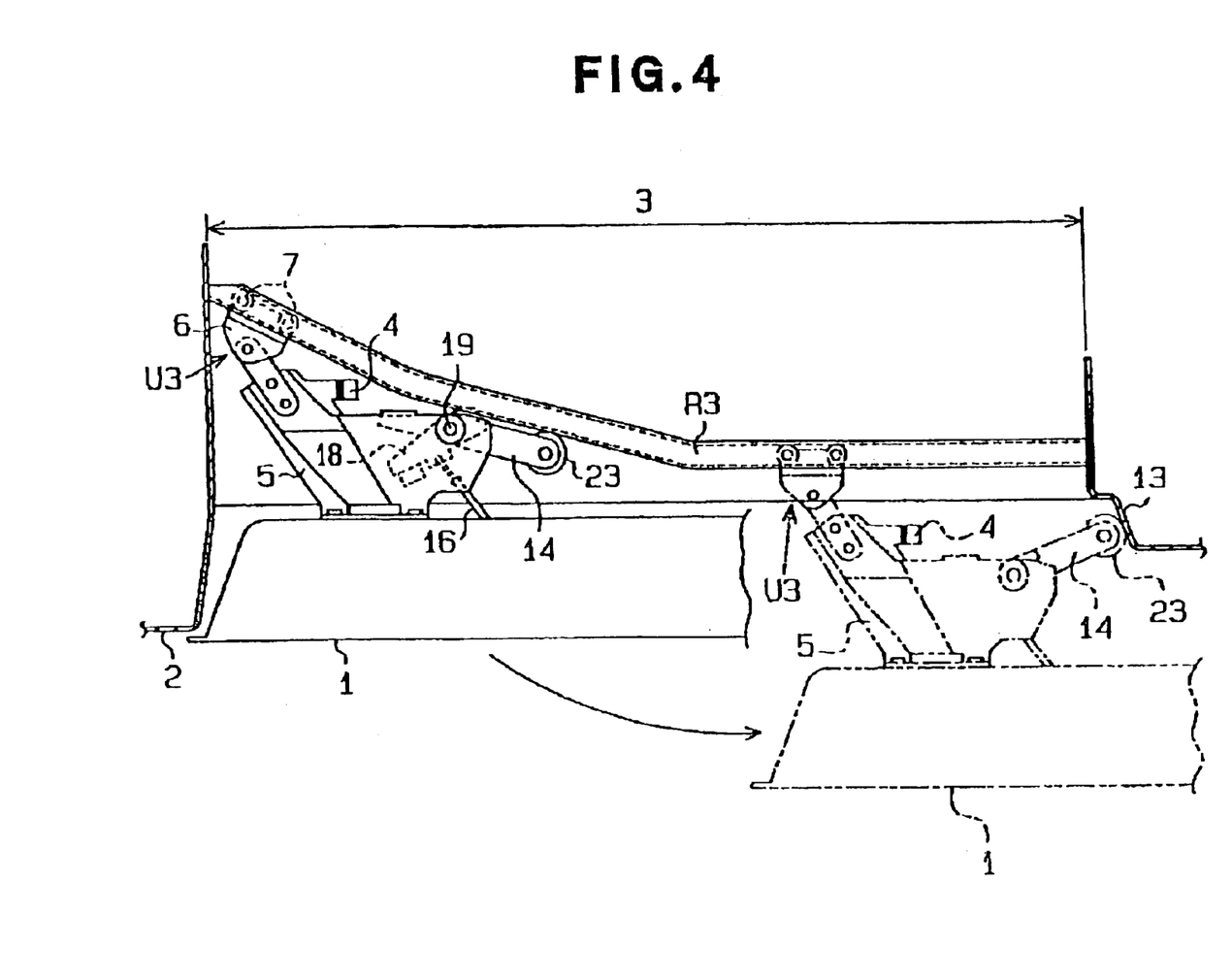
FIG. 4 is an explanatory view for explaining an operational performance of an entirely opening stopper and an intermediate stopper, which both are assembled to a lower roller unit, according to the embodiment of the present invention.
Figure 5:
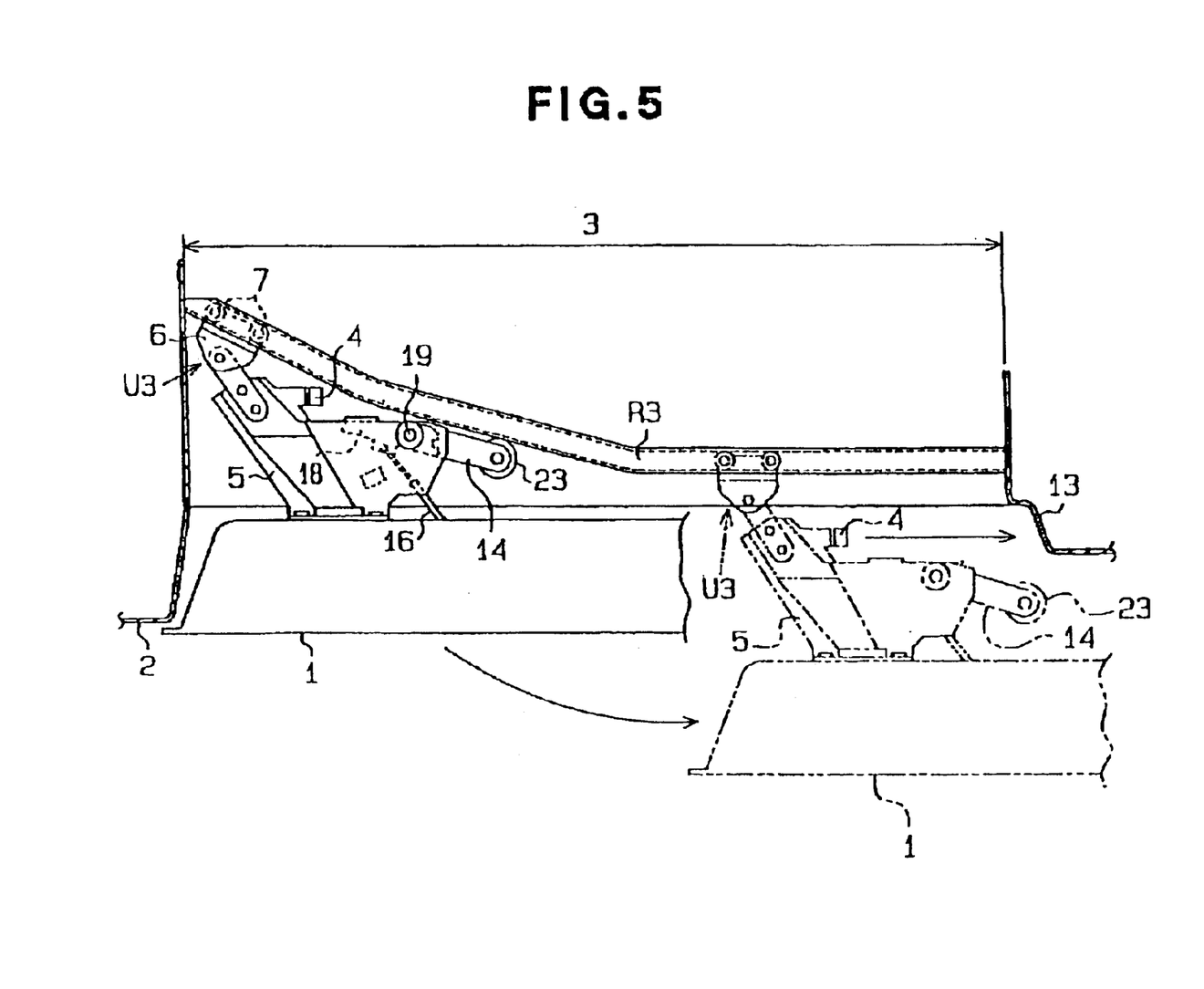
FIG. 5 is the other explanatory view for explaining the operational performance of the entirely opening stopper and the intermediate stopper according to the embodiment of the present invention.

As illustrated in FIGS. 4 and 5, the entirely opening stopper 4 is fixedly mounted on the bracket 5 capable of securing the lower roller unit U3 to the slide door 1. The entirely opening stopper 4 is arranged projecting in a vehicle rear direction (i.e. in a right-hand side direction of FIG. 1). As seen specifically in FIG. 5, the entirely opening stopper 4 comes in contact with a wall portion 13 of the vehicle bode 2 when the slide door 1 is positioned at the entirely open position corresponding to the slidable movement thereof in the vehicle rear direction. The wall portion 13 is defined to possess a constant length in a vehicle lateral direction. The wall portion 13 is formed by a panel member with a reasonable thickness so as to endure repetitive contacts with the entirely opening stopper 4. The entirely opening stopper 4 is made of an elastic member such as a rubber so as to absorb an impact force caused due to the contact with the wall portion 13.

<An Intermediate Stopper>

As illustrated in FIGS. 4 and 5, an intermediate stopper 14 is further provided for the lower roller unit U3. The intermediate stopper 14 takes various postures towards the vehicle body 2 in accordance with an opening amount of a window member 15 illustrated in FIG. 1. Therefore, when the slide door 1 is slidably moved to the entirely open position for uncovering the opening portion 3 in a state where the window member 15 is left open with a predetermined opening amount, the intermediate stopper 14 can effectively stop the slidable movement of the slide door 1 in the opening direction in advance that the slide door 1 is moved up to the entirely open position.

As illustrated in FIG. 1, the intermediate stopper 14 is operated associated with a window open detecting mechanism W and an interlocking cable 16 which both are disposed inside the slide door 1. The window open detecting mechanism W includes for example an arm member 17 capable of coming in contact with a lower edge portion of the window member 15 moved up and down (i.e. in vehicle vertical directions) and capable of being pivotably rotated in response to the down movement of the window member 15. When the window member 15 is moved down, for example over a hundred (100) mm in an opening direction, the lower edge portion of the window member 15 comes in contact with the arm member 17. The arm member 17 is then pivotably rotated in a vehicle lower direction along the down movement of the window member 15. The arm member 17 is connected to one end of the interlocking cable 16. When the arm member 17 is pivotably rotated in the vehicle lower direction, the interlocking cable 16 is pulled by the arm member 17.

Figure 6A:
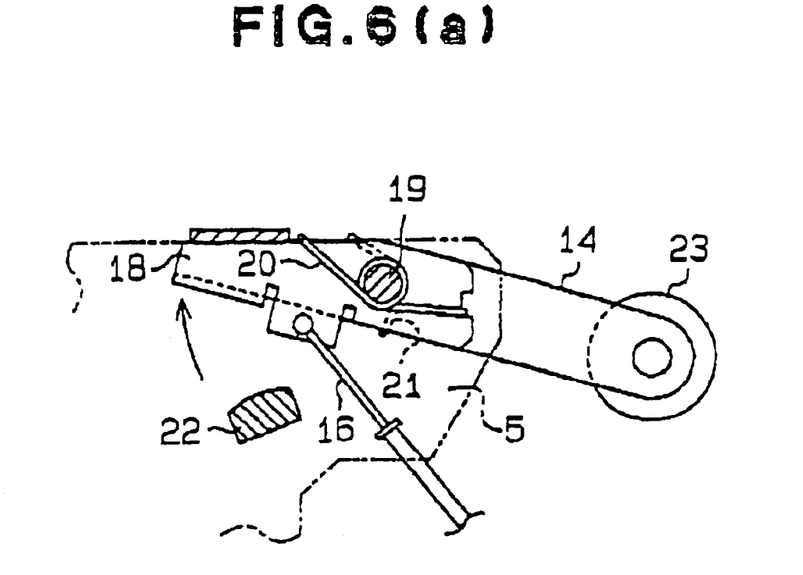
Figure 6B:
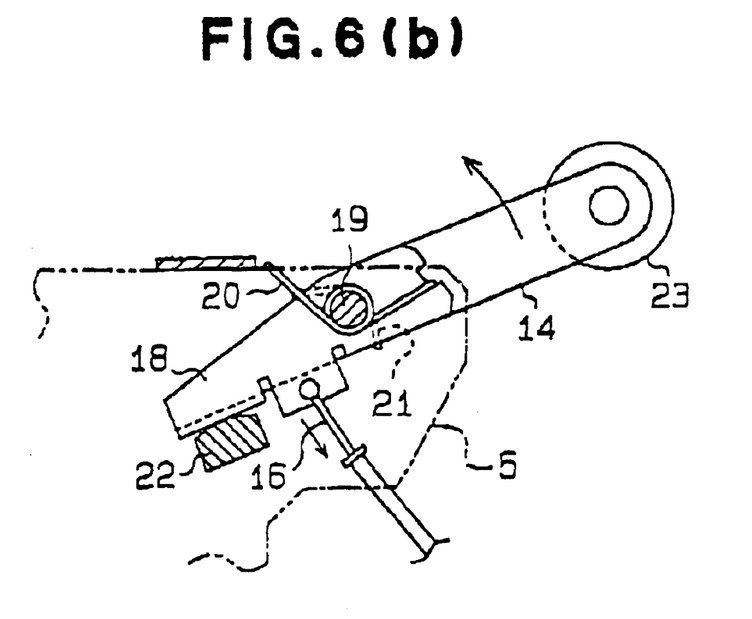

The other end of the interlocking cable 16 is connected to the intermediate stopper 14. As specifically seen in FIG. 6, the other end of the interlocking cable 16 is connected to a first operating member 18 arranged lying on the intermediate stopper 14. The intermediate stopper 14 and the first operating member 18 are pivotably and freely rotated about a supporting pin 19. A first spring member 20 is disposed between the first operating member 18 and the bracket 5 so as to rotate the first operating member 18 in a direction denoted by an arrow in FIG. 6(a). A biasing force of the first spring member 20 counters a pulling force of the interlocking cable 16. That is, the biasing force of the first spring member 20 functions for retracting the intermediate stopper 14 towards the slide door 1.

Further, a second spring member 21 is disposed between the first operating member 18 and the intermediate stopper 14. When the interlocking cable 16 is pulled in response to the down movement of the arm member 17, the intermediate stopper 14 takes a posture to project towards the vehicle body 2 via the first operating member 18 and the second spring member 21. However, a pivot rotation restricting member 22 restricts the intermediate stopper 14 from projecting towards the vehicle body 2 over a predetermined projecting amount. The restricted state of the intermediate stopper 14 is illustrated by a drawing in FIG. 6(b).

The interlocking cable 16 is pulled in accordance with the opening amount of the window member 15. The second spring member 21 is disposed for allowing the interlocking cable 16 to be further pulled. Therefore, when the interlocking cable 16 is further pulled when a further rotation of the intermediate stopper 14 has been restricted by the pivot rotation restricting member 22 as illustrated in FIG. 6(b), the only first operating member 18 can be pivotably rotated in a direction denoted by an arrow in FIG. 6(b).

According to the above described structure of the intermediate stopper 14, as illustrated in FIG. 4, a contact roller 23 assembled to a tip end portion of the intermediate stopper 14 comes in contact with the wall portion 13 when the slide door 1 is sildably moved in the opening direction. The contact roller 23 come in contact with the wall portion 13 prior to the contact of the entirely opening stopper 4 with the wall portion 13. Therefore, the sildable movement of the slide door 1 in the opening direction can be effectively stopped before the slide door 1 is moved up to the entirely open position. The window member 15 can be hence noticed to be left open before the slide door 1 is moved to the entirely open position for uncovering the opening portion 3.

<An Operational Performance>

Figure 7:
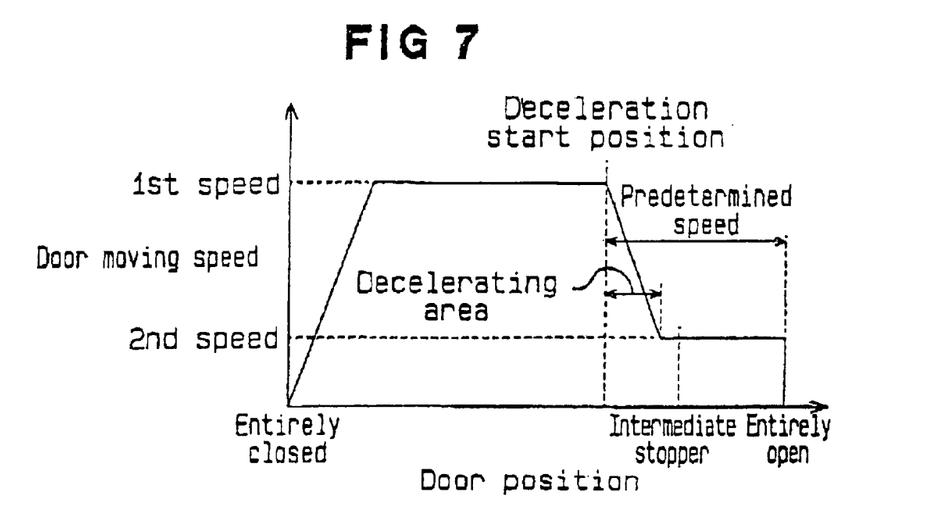
FIG. 7 is a graph illustrating a speed change for slidably moving the vehicle door in an opening direction according to the embodiment of the present invention.

Referring to FIG. 7, when a door switch (not shown) is manually operated for slidably moving the slide door 1 in the opening direction, the moving speed of the slide door 1 is accelerated up to a first speed. The slide door 1 is sildably moved at the first speed until the slide door 1 is moved to a deceleration start position. The moving distance of the slide door 1 is integrated by use of the pulse plate provided for the driving unit K. The integrated value is reset to be zero when the slide door 1 is returned to the closed position for entirely covering the opening portion 3. Therefore, the moving distance of the slide door 1 can be accurately obtained by integrating the rotational number of the driving motor 8. The integrated value is employed as a parameter for determining whether or not the slide door 1 has been moved to the deceleration start position.

Figure 8:
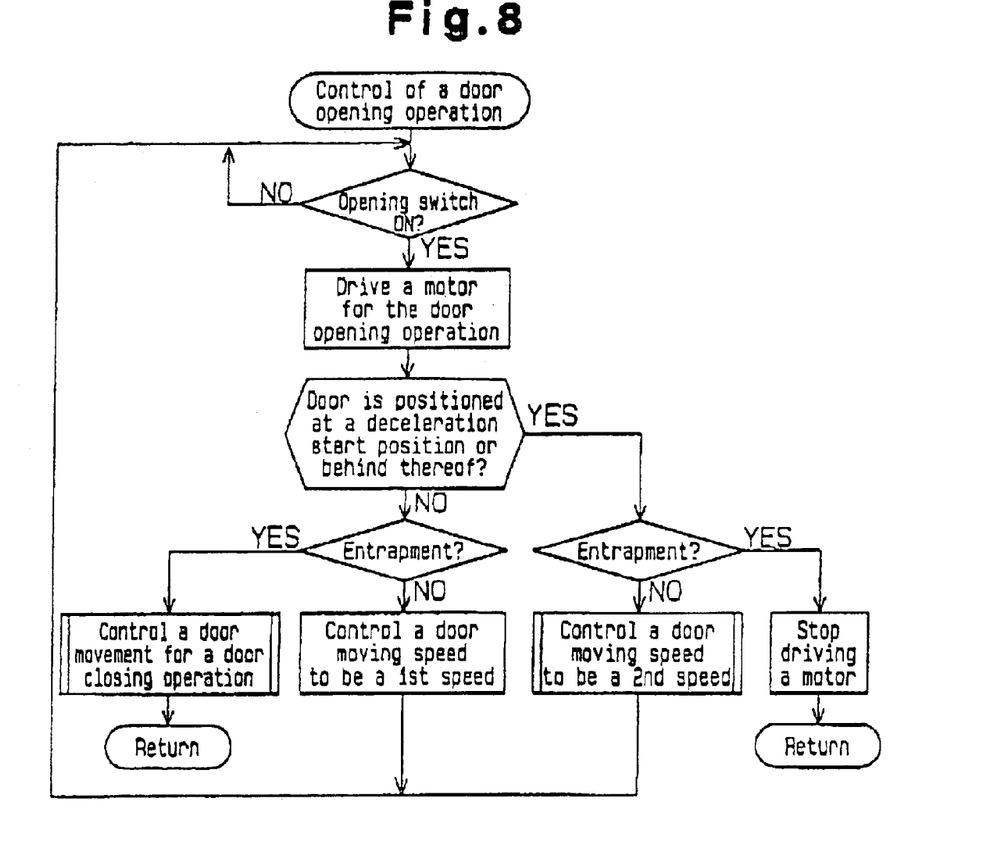
FIG. 8 shows a flow chart for explaining a process for terminating the slidable movement of the slide door in the opening direction according to the embodiment of the present invention.

When a foreign object is entrapped between the vehicle body 2 and the slide door 1 while the slide door 1 has been slidably moved in the opening direction at the first speed, the slide door 1 is applied with a resistance force so that the moving speed of the slide door 1 is decelerated. The speed deceleration of the slide door 1 is recognized by the driving unit K. When a speed decelerating amount exceeds a predetermined threshold value, the driving unit K determines that the foreign object has been entrapped and immediately stops the slidable movement of the slide door 1 in the opening direction. Subsequently, the slide door 1 is returned in a closing direction to the closed position for entirely closing the opening portion 3. The above-described operation corresponds to the process illustrated by a left-hand side of a flow chart of FIG. 8.

When the speed deceleration of the slide door 1 is not detected by the driving means K while the slide door 1 has been slidably moved in the opening direction at the first speed, the driving unit K decelerates the rotational speed of the driving motor 8 substantially at the same time that the slide door 1 passes the speed deceleration start position. The moving speed of the slide door 1 is hence decelerated down to a second speed which is set to be lower than the first speed. A decelerating area for performing the moving speed deceleration from the first speed to the second speed is designed when the slide door 1 has been slidably moving within a range of the slide stroke. Further, an endpoint of the decelerating area is designed to correspond to a position at which the intermediate stopper 14 has not come in contact with the wall portion 13 yet. Even when the intermediate stopper 14 is designed to project in the vehicle rear direction, the endpoint of the decelerating area should be designed in the same manner as described above.

According to the embodiment of the present invention, a moving speed of the slide door 1 after the slide door 1 passed the deceleration start position, i.e. any moving speeds being decelerated from the first speed to the second speed including the second speed are referred to as a predetermined speed, respectively. The moving speed of the slide door 1 should be controlled to be the predetermined speed for use in each corresponding position of the slide door 1 being moved in the opening direction from the closed position.

According to the embodiment of the present invention, when the slide door 1 is slidably moved within the decelerating area, the contact of the slide door 1 with obstacles can be recognized while the driving unit K decelerates the moving speed of the slide door 1 from the first speed to the second speed. After deceleration of the moving speed of the slide door 1 to the second speed, the driving unit K recognizes the contact while maintaining the moving speed of the slide door 1 at the second speed. That is, the slidable movement of the slide door 1 is stopped at a position where the driving unit K recognizes that the decelerating amount exceeds a predetermined threshold value in response to the deceleration due to the contact of the slide door 1 with the obstacles.

More particularly, the deceleration from the first speed to the second speed can be executed in accordance with a prescribed mode of the slide door apparatus for the vehicle according to the embodiment of the present invention. That is, as far as the position of the slide door can be estimated after the slide door was slidably moved to the decelerating area, the predetermined speed corresponding to each position of the slide door 1 can be uniquely determined. When the slide door comes in contact with the obstacle after start of the deceleration, the moving speed of the slide door is decelerated and becomes lower than the predetermined speed corresponding to each position of the slide door 1. When the speed differential between the predetermined speed and the actual speed of the slide door 1 becomes greater than the predetermined threshold value, the slidable movement of the slide door 1 can be effectively stopped. The moving speed of the slide door in the opening direction can be sufficiently decelerated especially in the vicinity of the entirely open position of the slide door 1. Therefore, even when the slide door 1 comes in contact with the entirely open stopper 4, the intermediate stopper 14, or the like, the slide door 1 can be safely stopped without generating a large impact force.

The above described predetermined threshold value is determined at an arbitrary value. When the threshold value is set at a relatively larger value, it can reduce a possibility to misidentify a fluctuation of the rotational speed of the driving motor 8 due to characteristics of the driving motor 8 as a fluctuation of the rotational speed of the driving motor 8 due to the contact of the slide door 1 with the obstacles. However, it may increase, a possibility to cause an excessive impact force between the slide door 1 and the obstacles. On the other hand, when each threshold value is set at a relatively smaller value, the slidable movement of the slide door 1 in the opening direction can be stopped before a large impact force occur between the slide door 1 with the obstacles. However, it may increase a possibility to misidentify the fluctuation of the rotation speed of the driving motor 8 due to the characteristics of the driving motor 8 as the fluctuation of the rotational speed of the driving motor 8 due to the contact between the slide door 1 and the obstacles. In this case, the slidable movement of the slide door 1 in the opening direction may be more frequently stopped even when it is not needed. Therefore, it is preferable to determine the threshold value in light of the above-described assumptions.

It is further preferable that the predetermined threshold value referred to within the decelerating area is set at a different value from the predetermined threshold value referred to after the slide door 1 passed the end point of the decelerating area. When the moving speed of the slide door 1 has reached down the second speed, the rotational number of the driving motor 8 can be stabilized. Therefore, the driving unit K can effectively detect even a relatively small speed fluctuation with a high detecting accuracy. On the other hand, when the moving speed of the slide door 1 has been decelerated within the decelerating area, the rotational speed of the driving motor 8 may easily fluctuate due to inertia of the slide door 1, and the like. For example, when the slide door 1 is slidably moved in the opening direction when the vehicle has been parked on a downhill slope or a uphill slope, the driving force required for slidably moving the slide door varies and the rotational speed of the driving motor 8 is increased or decreased. Therefore, it is preferable that the threshold value is set at a relatively larger value for preventing the misidentification of the fluctuation of the rotational speed of the driving motor 8 due to the characteristics thereof from the fluctuation of the rotational speed thereof due to the contact of the slide door 1 with the obstacles.

According to the embodiment of the present invention, the contact with the obstacles is applicable, for example for following three cases. The first case is when the entirely opening stopper 4 of the slide door 1 comes in contact with the wall portion 13 of the vehicle body 2 for normally stopping the sildable movement of the slide door 1 in the opening direction. The second case is when the intermediate stopper 14 comes in contact with the wall portion 13. The intermediate stopper 14 is designed to come in contact with the wall portion 13 before the slide door 1 is moved to the entirely open position. Therefore, when the slide door 1 is moved in the opening direction with the window member 15 being left open, the window member 15 can be easily recognized to have been left open. The third case is when a foreign object is unexpectedly entrapped between the slide door 1 and the vehicle body 2. In this case, the sildable movement of the slide door 1 in the opening direction is stopped. The moving speed of the slide door 1 has been already decelerated from the first speed to the second speed. Therefore, possible troubles due to the entrapment can be limited to a minimum level. With reference to the right-hand side of the flow chart illustrated in FIG. 8, the contact of the slide door 1 with the obstacles is referred to as an entrapment. However, "the entrapment" can also represent the contact of the wall portion 13 with the entirely opening stopper 4 or the intermediate stopper 14.

As described above, the slide door apparatus for the vehicle according to the embodiment of the present invention can sufficiently decelerate the moving speed of the slide door 1 and can maintain the moving speed at a constant speed in the vicinity of the entirely open position of the slide door 1. Therefore, the contact of the wall portion 13 with the entirely opening stopper 4, the intermediate stopper 14, and the like can be detected with a higher reliability so that the slidable movement of the slide door 1 can be stopped.

The above described slide door apparatus is not provided with a switch which was provided for the known slide door apparatus. Therefore, troubles for equipping the switch or the adjustment thereof can be omitted. Further, the slide door apparatus of the present invention can prevent the slide door 1 from coming in contact with the vehicle body 2 with an excessive impact force due to a failure of the switch. Further, the slide door apparatus of the present invention can be manufactured based upon a simpler structure not having the switch at a lower manufacturing cost.

Furthermore, the moving speed of the slide door 1 in the opening direction can be sufficiently decelerated before the intermediate stopper 14 comes in contact with the wall portion 13. Therefore, even if the slide door apparatus is provided with the intermediate stopper 14 of which posture is variable corresponding to the opening amount of the window member 15, the intermediate stopper 14 can be effectively prevented from being damaged by the contact with the wall portion with a large impact force.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A method for controlling a moving speed of a door in an opening direction for uncovering an opening portion defined in a vehicle body and in a closing direction for covering the opening portion comprising the steps of:

turning on a switch for slidably moving the door in the opening direction;

driving a driving means for driving the door to be moved in the opening direction;

determining whether or not the door being moved in the opening direction by the driving means is positioned in a decelerating area or beyond the decelerating area;

determining whether or not the door is in contact with the vehicle body when the door is positioned in the decelerating area or beyond the decelerating area; and controlling the moving speed of the door to change a first predetermined speed to a second predetermined speed which is lower than the first predetermined speed before the door comes in contact with the vehicle body.

2. A method for controlling the moving speed of the door in the opening direction according to claim 1, further comprising the steps of:

stop driving the driving means from driving when the door comes in contact with the vehicle body, wherein movement of the door in the opening direction is stopped.

3. A method for controlling the moving speed of the door in the opening direction according to claim 2, wherein the vehicle body is provided with at least either an entirely opening stopper or an intermediate stopper, the entirely opening stopper comes in contact with the door when the door is positioned at an entirely open position for uncovering the opening portion defined in the vehicle body, the intermediate stopper takes various postures relative to the door in response to an opening amount of a window member, and comes in contact with the door when the door is moved in the opening direction with the window member being left open with a predetermined opening amount.

4. A method for controlling the moving speed of the door in the opening direction according to claim 2, wherein the door is provided with at least either an entirely opening stopper or an intermediate stopper, the entirely opening stopper comes in contact with the vehicle body when the door is positioned at an entirely open position for uncovering the opening portion defined in the vehicle body, the intermediate stopper takes various postures relative to the door in response to an opening amount of the window member, and comes in contact with the door when the door is moved in the opening direction with the window member being left open with a predetermined opening amount.

5. A method for controlling the moving speed of the door in the opening direction according to claim 1, wherein the door comes in contact with the vehicle body via an obstacle being entrapped between the door and the vehicle body when the door is positioned in the decelerating area or beyond the decelerating area, wherein the moving speed of the door is controlled to be the second predetermined speed.

6. A method for controlling the moving speed of the door in the opening direction according to claim 1, wherein the second predetermined speed corresponding to the moving speed of the door is sufficiently low for preventing an unexpected contact of the door with the vehicle body.

7. A method for controlling the moving speed of the door in the opening direction according to claim 1, further comprising the steps of:

determining whether or not an obstacle is being entrapped between the door and the vehicle body when the door is positioned ahead of the decelerating area; and controlling the moving speed of the door to be the first predetermined speed when the obstacle is not entrapped between the door and the vehicle body.

8. The method for controlling the moving speed of the door in the opening direction according to claim 7, further comprising the steps of:

controlling the door to be moved in the closing direction for covering the opening portion defined in the vehicle body when the obstacle is entrapped between the door and the vehicle body.

* * * * *

UNITED STATES PATENT AND TRADEMARK OFFICE
CERTIFICATE OF CORRECTION

PATENT NO. : 6,814,394 B2
DATED : November 9, 2004
INVENTOR(S) : Hiroyuki Yogo et al.

It is certified that error appears in the above-identified patent and that said Letters Patent is hereby corrected as shown below:

Column 10,
Line 65, change "A method" to -- The method --.

Column 11,
Line 1, change "stop driving" to -- stopping --.
Lines 5, 17 and 29, change "A method" to -- The method --.

Column 12,
Line 6, change "A method" to -- The method --.

Signed and Sealed this

Sixth Day of September, 2005

JON W. DUDAS
*Director of the United States Patent and Trademark Office*